SEMICONDUCTOR RECTIFIERS

Filed July 31, 1953

INVENTOR.
CHARLES W. MUELLER
BY J. C. Whittaker
ATTORNEY 2,781,480

SEMICONDUCTOR RECTIFIERS

Charles W. Mueller, Princeton, N. J., assignor to Radio Corporation of America, a corporation of Delaware Application July 31, 1953, Serial No. 371,648

7 Claims. (Cl. 317—234)

This invention relates to semiconductor devices and particularly to stacked semiconductor rectifiers.

In the manufacture of semiconductor devices such as rectifiers, it is comparatively difficult to make devices which have exactly the same characteristics such as, for example, the same impedances. Although ordinarily this problem is not too critical, there are certain applications wherein such differences in characteristics may become intolerable. One such application is in stacked rectifiers which comprise a plurality of individual rectifier units connected in series and/or parallel to provide certain desirable operating characteristics.

A stacked rectifier comprising, for example, two semiconductor rectifiers connected in series may be operated with a voltage source connected across the stack. If the two rectifiers have different impedances, the power dissipated in one will be larger than in the other and overheating and damage may result. In semiconductor rectifiers, this problem arises, particularly, with rectifiers which have different reverse impedances.

Accordingly, one object of the invention is to provide a stacked semiconductor rectifier of new and improved form.

Another object of the invention is to provide an improved stacked rectifier having means for compensating for differences in characteristics between the individual units thereof.

A further object of the invention is to provide an improved stacked rectifier having substantially uniform operating characteristics.

In general, the purposes and objects of this invention are accomplished by assembling a plurality of semiconductor rectifiers in an insulating tubing, the inner surface of which is provided with a coating of resistive material. The resistive coating serves as a parallel resistance for each of the rectifiers and tends to equalize differences in resistance and in the voltage drop across each of the rectifier units.

The invention is described in greater detail by reference to the drawing wherein.

Similar elements are designated by similar reference characters throughout the drawing.

Figures 1, 2, 3, 4:
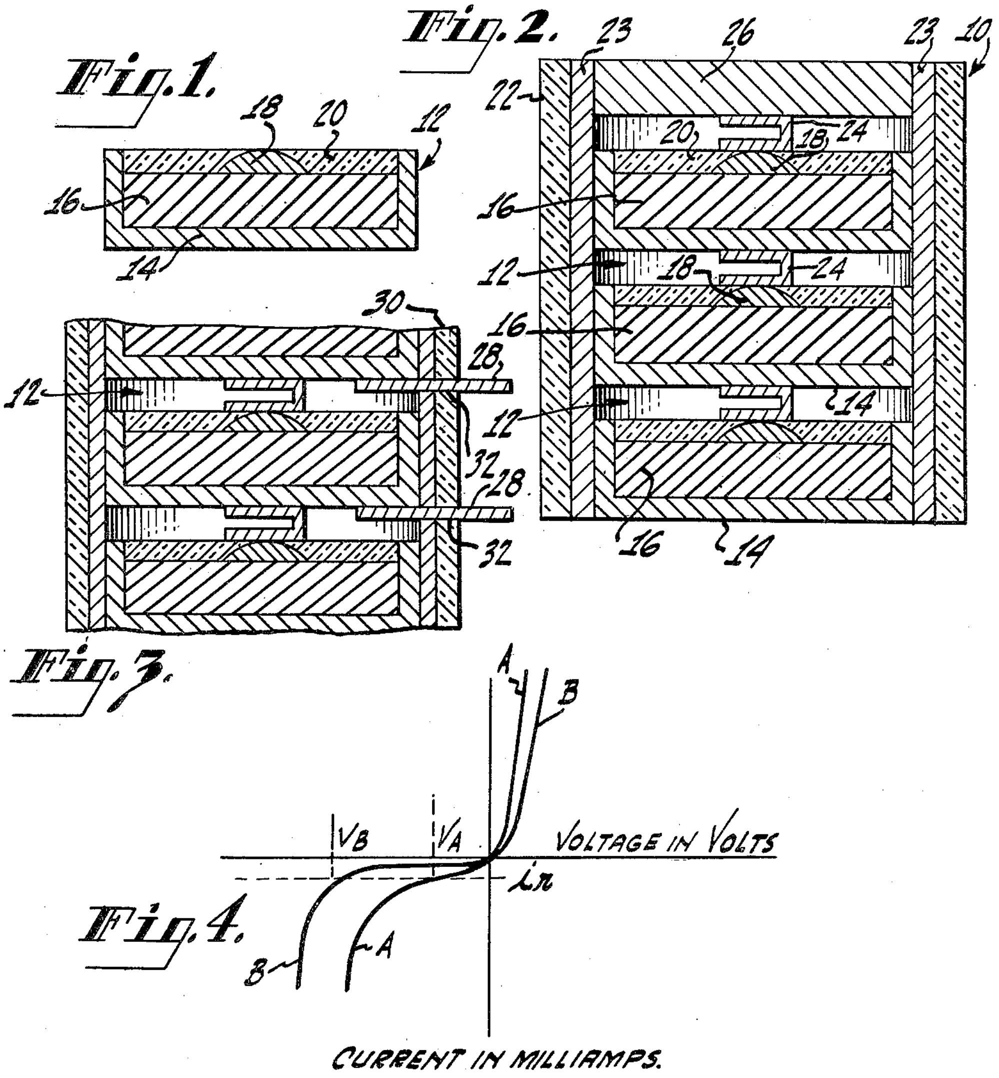
Fig. 1 is a sectional, elevational view of a single semiconductor rectifier which may be employed in the stacked rectifier of the invention.
Fig. 2 is a sectional, elevational view of a stacked rectifier prepared according to the principles of the invention.
Fig. 3 is a fragmentary, sectional, elevational view of a first modification embodying the principles of the invention.
Fig. 4 represents voltage vs. current characteristic curves for two typical rectifier units; and, Fig. 5 is a fragmentary, elevational view of a second modification of the device shown in Fig. 3.

Referring to Figures 1 and 2, a stacked rectifier 10 according to the invention comprises a plurality of individual rectifier units 12, each of which includes a metallic cup 14 in which a semiconductor crystal 16 is positioned. The cup may be somewhat larger than the crystal to allow for expansion or the cup may be made of a metal which matches the coefficient of expansion of the crystal. The crystal 16 may comprise germanium, silicon or the like of N-type or P-type conductivity. For the purposes of this description, the semiconductor crystal will be assumed to be N-type germanium. For crystals of germanium, the cups 14 may be of stainless steel which has substantially the same coefficient of expansion as germanium. The germanium crystal 16 is provided with a P–N junction rectifying electrode 18 which may be prepared in any suitable manner. One suitable method for preparing a P–N junction is described in my co-pending application, Serial No. 295,304, filed June 24, 1952, and assigned to the assignee of this application.

Briefly according to the method described in the aforementioned application, a quantity of a suitable impurity material is positioned on the surface of the germanium crystal 16 and the assembly of cup, crystal and impurity material is heated to a temperature sufficient to cause the impurity material to melt and alloy with the germanium and to form, on cooling, the desired P–N junction electrode 18. For forming a P–N junction electrode in a body of N-type germanium, the impurity material may comprise one or more acceptor substances such as indium, aluminum, gallium, thallium, boron or zinc. For a germanium crystal of P-type conductivity, the impurity material may comprise one or more donor substances such as arsenic, bismuth, antimony, sulfur, selenium, tellurium or phosphorus.

After the P–N junction electrode 18 has been formed, the remainder of the cup 14 is filled with an insulating material 20 such as a resin or plastic of the type known as Araldite. Araldites are condensation products of polyarylepoxy-ethane compounds. Thus a compact rectifier unit is provided having electrical contact areas provided by the cup 14 and the electrode 18.

Referring to Figure 2, according to the invention, a plurality of rectifier units 12 are stacked within an insulating housing 22 of ceramic, glass, plastic, or the like, which may be in the form of a hollow cylinder or in any other convenient form. The inner surface of the housing is provided with a uniform coating 23 of a conductive material such as that which may be formed by deposition of the vapors of stannic chloride and methanol. The coating may be applied by spraying, painting or by evaporation from a solution of a conductive liquid. The coating may cover the entire inner surface of the housing 22 or it may be a narrow strip or strips extending along the length thereof. The coating preferably has a resistivity such that the resistance of a portion thereof parallel with any one rectifier unit is substantially equal to that of the stack rectifier having the lowest resistance in the reverse or blocking direction.

A metallic member 24 is provided between each rectifier unit 12 to provide electrical contact therebetween. The member or connector 24 makes contact between the cup 14 of one unit and the P–N junction electrode of an adjacent unit. The metallic contact may be in any suitable form, for example, it may be a metal disk or it may be a U-shaped resilient piece of metal such as nickel, copper, platinum, platinum-plated or palladium-plated metal or the like. A metal disk 26 or the like is provided to close the end of the tubing after the desired number of units have been mounted therein and to provide electrical contact to the junction electrode of the top-most unit.

In operation of the stacked rectifier 10, a voltage is applied across the stack between the plate or disk 26 and the cup 14 of the last unit of the stack. When the applied signal is in the forward direction or in the direction of easy current flow, the resistance of each rectifier unit to the signal is very low and differences in resistance are of no real significance. However in the reverse half of the signal cycle when the applied voltage tends to force current in the reverse direction through the rectifier units, difficulties arise. Referring to Figure 4, current vs. voltage characteristics A and B are shown for two typical rectifier units in a stacked rectifier. Assuming that the reverse current through the entire rectifier stack is represented by the current $i_r$, the horizontal dash line extending along the $i_r$ current line intersects the characteristic curves A and B at points representing voltages $V_A$ and $V_B$. $V_A$ and $V_B$ thus are the voltage which appear across each of the rectifier units due to the current $i_r$. Since the current through each rectifier unit is the same and the voltages are so different, the power dissipated in one is considerably more than that dissipated in the other. This large amount of power may, under some circumstances be sufficient to destroy the device. With respect, now, to the resistance coating 23, the portions thereof adjacent to each rectifier unit serve as resistances in parallel with these units. As mentioned above, each portion of coating 23 has substantially the same resistance as that of the stack rectifier having the lowest resistance in the reverse or blocking direction. The resistance of the parallel combination is lower than the resistance of each portion thereof and, accordingly, large differences in the resistance of individual units tend to be nullified. Furthermore, in any one parallel combination, if the resistance of the rectifier is larger than that of the coating, current will be diverted through the coating with the result that the voltage drop across the rectifier unit will be reduced and will approach the voltage drop across the rectifier having the lowest resistance. With proper selection of the units comprising the rectifier stack to include devices having high reverse impedance, the small reverse current which flows does not impede normal circuit operation. One suitable application of a semiconductor stacked rectifier may be in a circuit for developing the high voltage for a television kinescope.

Figure 5:
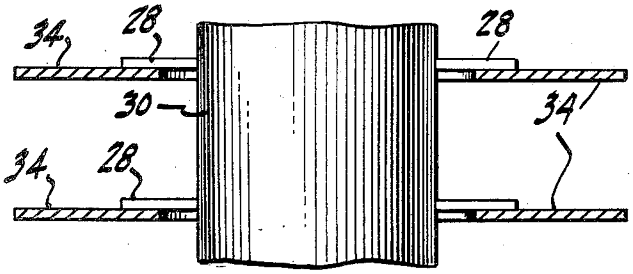

In a modification of the invention shown in Figure 3, the individual rectifier units 12 are provided with electrically conductive contact tabs 28 of nickel or the like which are soldered to each of the metal cups 14. The units 12 are stacked in a housing 30 comprising a length of insulating tubing which is provided with openings 32 through which the tabs 28 protrude to facilitate electrical contact thereto. This construction allows the selection and use of only a portion of the entire stack of rectifier units.

Where it is desired to provide cooling means for the individual rectifier units, a plurality of tabs 28 of large cross-sectional area may be soldered to the cups 14 and in addition cooling fins 34, for example in the form of rings, may be soldered to the tabs outside of the housing 30, as shown in Figure 5.

What is claimed is:

1. A rectifier device comprising a plurality of rectifier units arranged in stacked array, an insulating housing surrounding and enclosing said units, and a uniform coating of resistive material interposed between said units and said housing and extending along the length of said housing whereby a voltage applied across all of said units is substantially uniformly distributed across each of said units.

2. A rectifier device comprising a plurality of rectifier units arranged in stacked array, an insulating housing surrounding and enclosing said units, and a uniform coating of resistive material interposed between said units and said housing and extending along the length of at least a portion of the inner surface of said housing whereby a voltage applied across all of said units is substantially uniformly distributed across each of said units.

3. A rectifier device comprising a plurality of rectifier units being electrically connected in stacked array, an insulating housing surrounding and enclosing said units, a uniform coating of resistive material interposed between said units and said housing and extending along the length of said housing whereby a voltage applied across all of said units is substantially uniformly distributed across each of said units, and means connected to each of said units for promoting the dissipation of heat therefrom.

4. The device described in claim 3 and wherein said means comprises electrically conductive members.

5. The device described in claim 3 and wherein said means comprises electrically conductive tabs extending through said housing and including further heat radiating means bonded thereto outside of said housing.

6. A rectifier device comprising a plurality of rectifier units electrically connected in stacked array, each of said units comprising a metal cup, a semiconductor crystal retained within said cup and a rectifying electrode in operative relation with said crystal, an insulating housing surrounding and enclosing said units, a resistive material interposed between said units and said housing and extending along the length of said housing whereby a voltage applied across all of said units is substantially uniformly distributed across each of said units, metal tabs bonded to each of said metal cups and extending through said housing, and heat radiating means bonded to said tabs outside of said housing.

7. The device described in claim 6 wherein said rectifying electrode is a P–N junction electrode.

References Cited in the file of this patent

UNITED STATES PATENTS 2,189,887 Jones et al. ............ Feb. 13, 1940